(12) United States Patent
Stone et al.

(10) Patent No.: US 9,771,225 B2
(45) Date of Patent: Sep. 26, 2017

(54) METHODS AND APPARATUS FOR MONITORING A LOADING DOCK

(71) Applicants: Bradley J. Stone, Port Washington, WI (US); Kenneth C. Bowman, Cedarburg, WI (US); Matthew Sveum, Wauwatosa, WI (US)

(72) Inventors: Bradley J. Stone, Port Washington, WI (US); Kenneth C. Bowman, Cedarburg, WI (US); Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 14/878,204

(22) Filed: Oct. 8, 2015

(65) Prior Publication Data

US 2017/0101278 A1 Apr. 13, 2017

(51) Int. Cl.
*G08B 21/22* (2006.01)
*B65G 69/00* (2006.01)
(Continued)

(52) U.S. Cl.
CPC .......... *B65G 69/00* (2013.01); *B65G 69/2811* (2013.01); *B65G 69/2882* (2013.01); *G08B 21/02* (2013.01)

(58) Field of Classification Search
CPC .... B65G 69/2882; B65G 69/00; B65G 69/28; B65G 69/287; B65G 69/2876; B65G 69/2888; B65G 69/2894
See application file for complete search history.

(56) References Cited

U.S. PATENT DOCUMENTS 3,786,530 A * 1/1974 Le Clear ............ B65G 69/2841
14/71.3
4,772,875 A 9/1988 Maddox et al.
(Continued)

FOREIGN PATENT DOCUMENTS

EP 1775692 4/2007
EP 2206664 7/2010
(Continued)

OTHER PUBLICATIONS

Bea Inc., "LZR®-Microscan—Stand-Alone, Door Mounted, Safety Sensor for Automatic Swing Doors (US version)," published Jan. 7, 2014, 12 pages.
(Continued)

*Primary Examiner* — Van Trieu
(74) *Attorney, Agent, or Firm* — Hanley, Flight & Zimmerman, LLC

(57) ABSTRACT

Methods and apparatus for monitoring a dock leveler are disclosed. An example method for monitoring a loading dock includes determining if a door at a doorway of a loading dock is in an open position; determining if a vehicle is present at the doorway; determining if a body is present in a first area of the loading dock, the first area including a deck positioned adjacent the doorway; and determining if a body is present in a second area of the loading dock adjacent the doorway, the second area including only a portion of a deck adjacent the doorway.

19 Claims, 12 Drawing Sheets

(51) Int. Cl.
*B65G 69/28* (2006.01)
*G08B 21/02* (2006.01)

(56) References Cited

U.S. PATENT DOCUMENTS

| | | | |
|---|---|---|---|
| 4,853,531 A | 8/1989 | Rejc | |
| 4,903,009 A | 2/1990 | D'Ambrosia et al. | |
| 4,949,074 A | 8/1990 | D'Ambrosia et al. | |
| 4,950,118 A | 8/1990 | Mueller et al. | |
| 7,045,764 B2 | 5/2006 | Beggs et al. | |
| 7,256,703 B2 | 8/2007 | Duvernell et al. | |
| 7,274,300 B2 | 9/2007 | Duvernell et al. | |
| 7,380,375 B2 | 6/2008 | Maly | |
| 8,191,194 B2 * | 6/2012 | Belongia | B65G 69/2876 14/71.3 |
| 8,547,234 B2 | 10/2013 | Maly et al. | |
| 8,806,689 B2 | 8/2014 | Riviere et al. | |
| 2002/0190849 A1 | 12/2002 | Orzechowski | |
| 2003/0102974 A1 | 6/2003 | Allen | |
| 2004/0075046 A1 | 4/2004 | Beggs et al. | |
| 2005/0074140 A1 | 4/2005 | Grasso et al. | |
| 2005/0140319 A1 | 6/2005 | Takashima | |
| 2006/0137261 A1 | 6/2006 | Maly | |
| 2006/0162254 A1 | 7/2006 | Imai et al. | |
| 2006/0187037 A1 | 8/2006 | Eubelen et al. | |
| 2007/0008124 A1 | 1/2007 | Stadler et al. | |
| 2007/0182550 A1 | 8/2007 | Castello et al. | |
| 2008/0022596 A1 * | 1/2008 | Boerger | E06B 9/82 49/31 |
| 2008/0127435 A1 * | 6/2008 | Maly | B65G 69/2882 14/71.1 |
| 2008/0223667 A1 | 9/2008 | Tinone et al. | |
| 2009/0008042 A1 * | 1/2009 | Snyder | E01F 13/028 160/264 |
| 2010/0146719 A1 * | 6/2010 | Swessel | B65G 69/2882 14/71.3 |
| 2013/0312205 A1 * | 11/2013 | Riviere | B65G 69/2882 14/71.3 |
| 2015/0138002 A1 | 5/2015 | Beggs et al. | |
| 2015/0375947 A1 * | 12/2015 | Hochstein | B60Q 9/002 348/143 |
| 2016/0009177 A1 | 1/2016 | Brooks et al. | |

FOREIGN PATENT DOCUMENTS

| | | |
|---|---|---|
| EP | 2465796 | 6/2012 |
| GB | 2119987 | 11/1983 |
| WO | 2008008699 | 1/2008 |
| WO | 2009070509 | 6/2009 |
| WO | 2012084919 | 6/2012 |
| WO | 2013022877 | 2/2013 |
| WO | 2014123733 | 8/2014 |

OTHER PUBLICATIONS

Bea Inc., "LZR®-Microscan—Standalone, Door-Mounted, Swing Door Safety System," published Jan. 8, 2014, 2 pages.
Bea Inc., "Sparrow," published Jan. 2010, 2 pages.
Bea Inc., "Sparrow—Opening Sensor for Industrial Doors," published Mar. 2011, 2 pages.
Bea Inc., "Falcon—Opening Sensor for Industrial Doors," published Mar. 2011, 2 pages.
Bea Inc., "LZR®-i100—Safety Sensor for Industrial Doors," published Aug. 2011, 2 pages.
Bea Inc., "LZR®-i30—Laser Scanner for Industrial Doors," published Oct. 28, 2014, 12 pages.
Pepperl+Fuchs, "Ultrasonic sensor," published Aug. 12, 2015, 5 pages.
International Searching Authority, "International Search Report" issued in connection with PCT Patent Application No. PCT/US2016/055779, mailed on Jan. 17, 2017, 5 pages.
International Searching Authority, "Written Opinion," issued in connection with PCT Patent Application No. PCT/US2016/055779, mailed on Jan. 17, 2017, 6 pages.

* cited by examiner

METHODS AND APPARATUS FOR MONITORING A LOADING DOCK

FIELD OF THE DISCLOSURE

The present disclosure relates generally to monitoring systems and, more specifically, to methods and apparatus for monitoring a loading dock.

BACKGROUND

Loading docks provide an area for vehicles (e.g., trucks, trailers, etc.) to move next to an elevated platform of a building so that cargo can be readily transferred between the vehicle and the building. Some loading docks include equipment such as dock levelers, vehicle restraints and/or various sensors. Dock levelers provide an adjustable bridge over which material handling equipment can travel between the platform and a bed or trailer of the vehicle. Some example vehicle restraints have barriers that engage some part of the vehicle to help prevent the vehicle from prematurely driving away from the platform.

DETAILED DESCRIPTION

Figure 4:
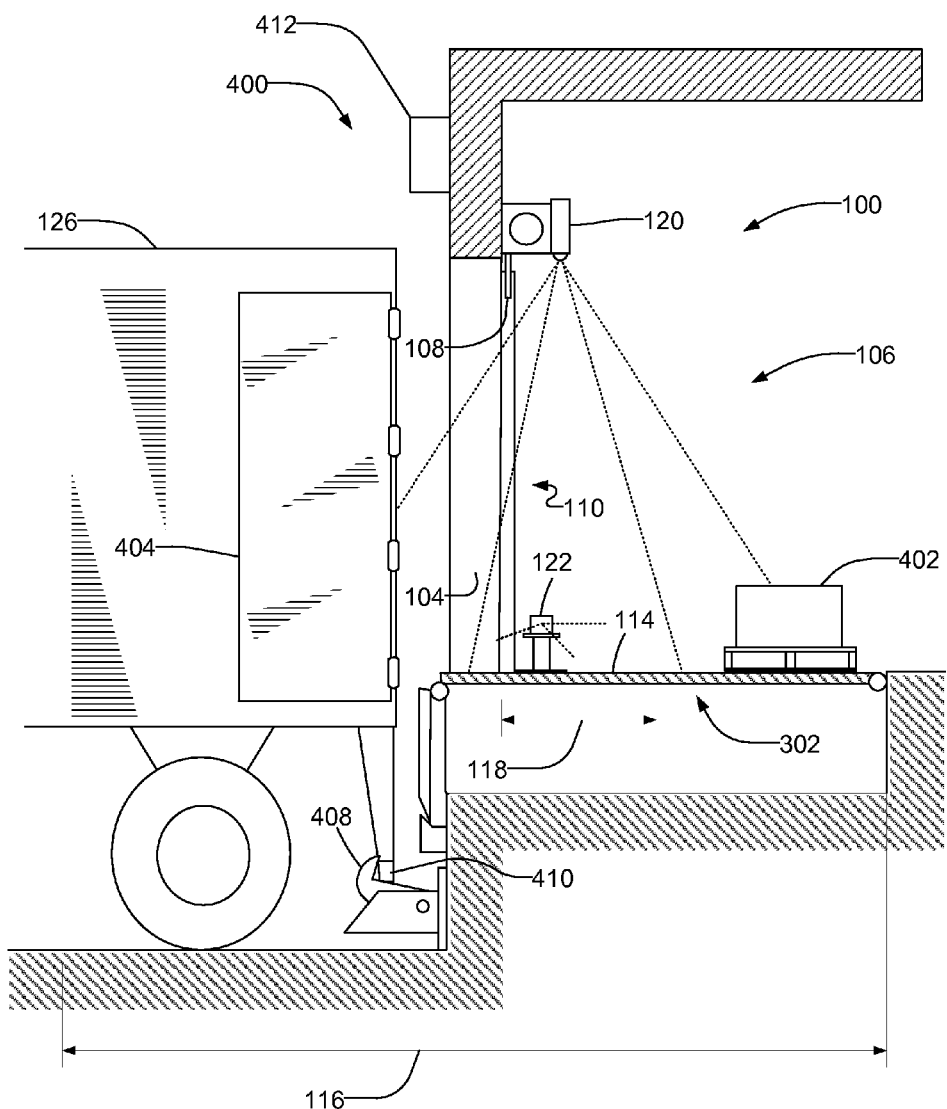
FIG. 4 is a side view of the example loading dock of FIG. 1 but showing a vehicle present at the loading dock.

Example dock leveler systems disclosed herein monitor, detect and/or determine conditions at the loading dock that include whether a body (e.g., a person, an object, a material handling equipment, etc.) is present at the loading dock. More specifically, the example dock leveler systems disclosed herein detect whether a body is present in a first area of the loading dock and/or the second area of the loading. Detection of the body in either the first area or the second area may affect an operation of the deck, an operation of a door, etc. In some examples, the example dock leveler systems disclosed herein detect or determine conditions at the loading dock 10 that include whether a dock door of the loading dock is an open position allowing access to an exterior of a building via a doorway of a building or a closed position restricting access to the exterior of the building via the doorway. In some examples, the example dock leveler systems disclosed herein detect or determine conditions at the loading dock that include whether the deck is elevated to a position sufficient to provide a barrier relative to the doorway when the body is detected at the loading dock. For example, in some such examples, the example dock leveler systems disclosed herein detect or determine conditions at the loading dock that include whether the deck is positioned at an angle (e.g., relative to horizontal) that is greater than a threshold (e.g., a minimum angle causing the deck to be too elevated or excessively inclined) to receive certain material handling equipment (e.g., a laser guided vehicle, an automatic guided vehicle, a forklift, etc.). In some examples, the example dock leveler systems disclosed herein detect or determine conditions at the loading dock that include whether the deck is elevated to a position sufficient to enable a lip of the deck to extend (e.g., to a fully extended or deployed position) without interfering with a vehicle parked at the loading dock. In some examples, the example dock leveler systems disclosed herein detect or determine conditions at the loading dock that include whether a rear cargo door of the vehicle is in an open position (e.g., as shown in FIG. 4) or a closed position.

Figure 1:
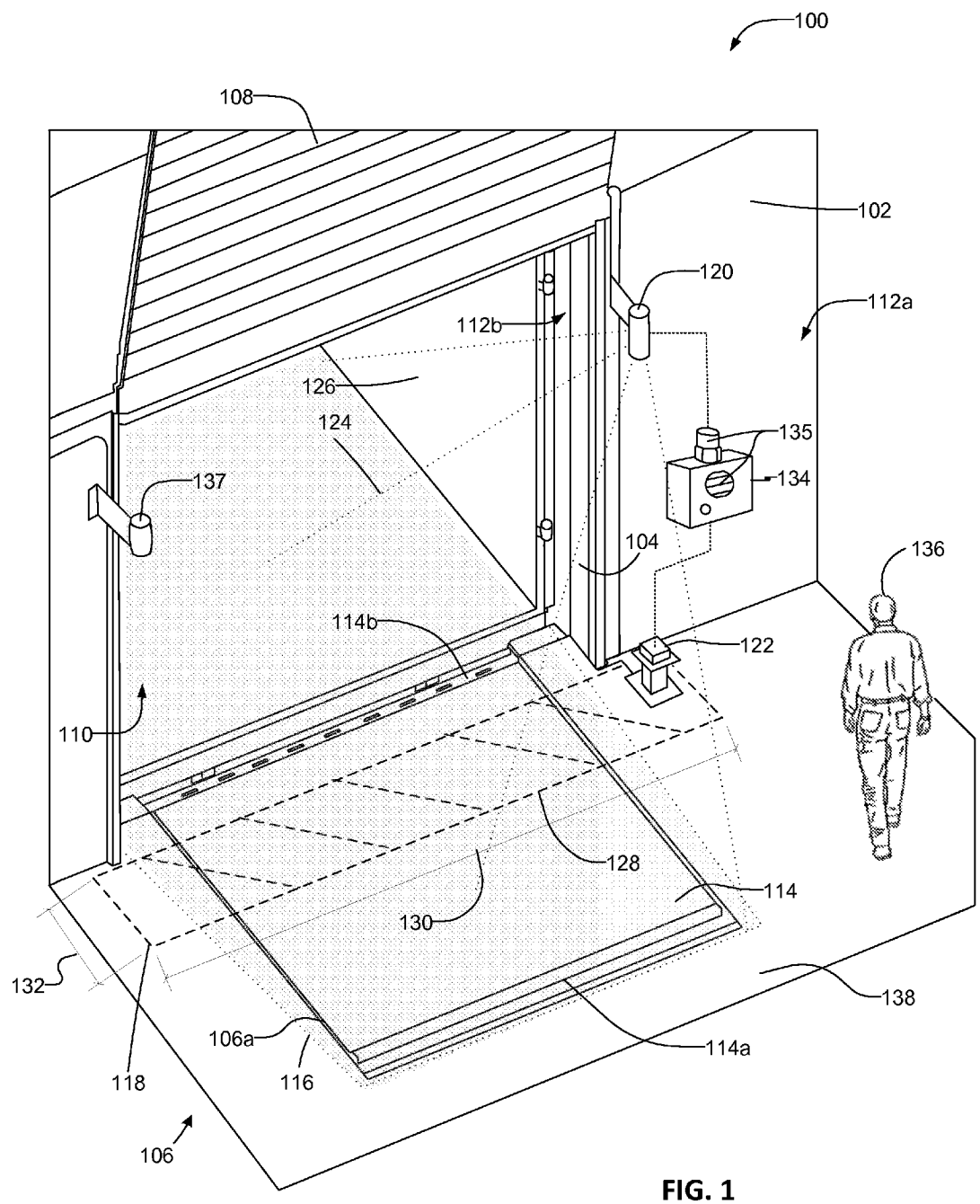
FIG. 1 is a perspective view of an example dock leveler system constructed in accordance with the teachings disclosed herein.
Figure 2:
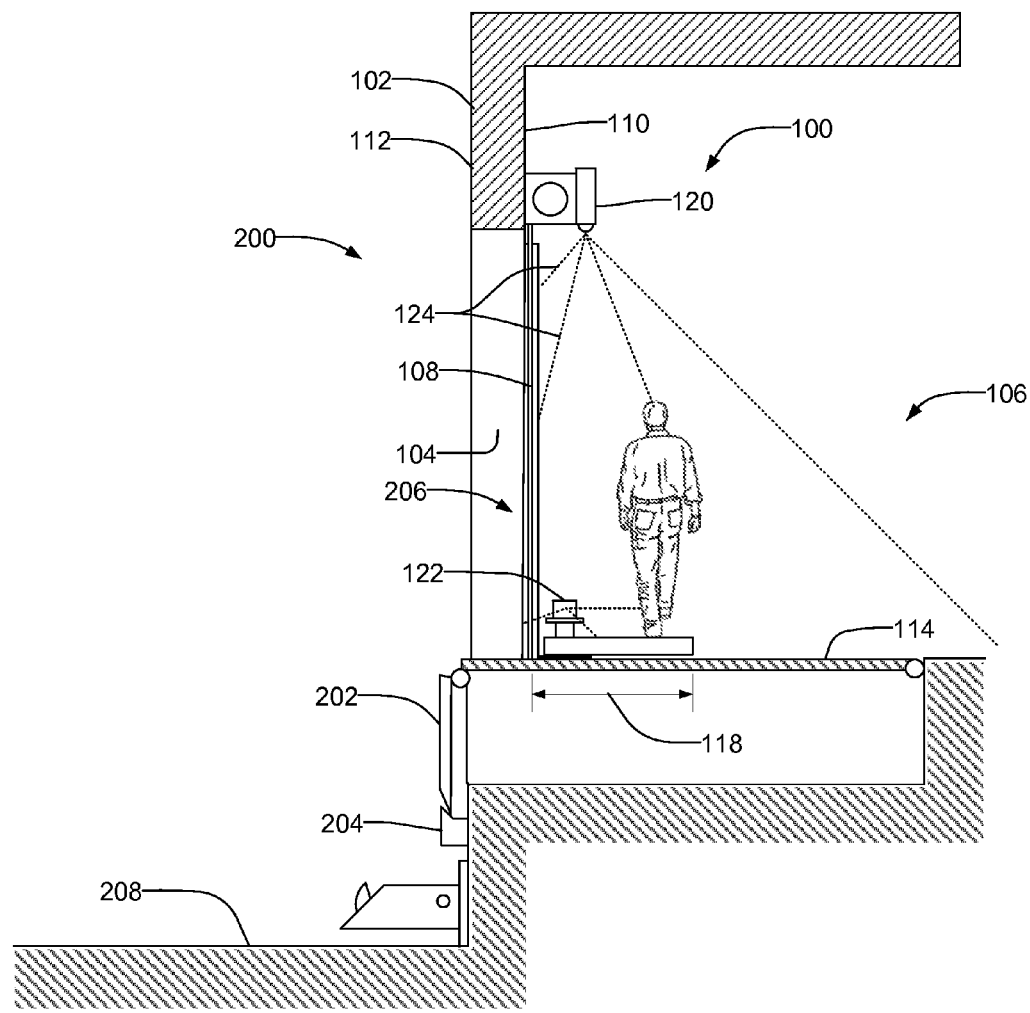
FIG. 2 is a side view of an example loading dock shown in FIG. 1 showing a door of the example loading dock in a closed position.

FIG. 1 illustrates an example dock leveler system 100 in accordance with the teachings of this disclosure. FIG. 1 is an inside view of a building 102 with a doorway 104 and a loading dock 106 having a dock leveler 106a. The loading dock 106 of the illustrated example includes a door 108 that moves between an open position 110 (e.g., as shown in FIG. 1) to allow access between an interior 112a of the building 102 and an exterior 112b of the building 102 and a closed position (e.g., as shown in FIG. 2) to prevent access to the interior 112a of the building 102. The example dock leveler system 100 of FIG. 1 monitors and/or detects various conditions at the loading dock 106. Under certain conditions, the example dock leveler system 100 of the illustrated example provides one or more alarm signals and/or warnings that warn of a potential falling hazard where someone or something could possibly fall off a deck 114 of the dock leveler 106a via the doorway 104 of the loading dock 106 when the door 108 is the open position. In some examples, the dock leveler system 100 of FIG. 1 prevents operation of the door 108 moving from the closed position to the open position 110 when a body is detected within a certain distance (e.g., within 4 feet) of the door 108.

The dock leveler system 100 of the illustrated example monitors a first area 116 adjacent the doorway 104 of the loading dock 106 to detect a first condition (e.g., a plurality of first conditions) and a second area 118 adjacent the doorway 104 to detect a second condition (e.g., a presence of a body, personnel, a forktruck, etc.) in the second area 118 adjacent the doorway 104. The first area 116 of the illustrated example is greater or larger than the second area 118. In some examples, the first area 116 overlaps the second area 118.

To monitor the first area 116 and the second area 118, the example dock leveler system 100 of the illustrated example includes a first sensor 120 and a second sensor 122, respectively. The first sensor 120 (e.g., an optical sensor) of the illustrated example provides a first field of view 124 (e.g., three-dimensional) to monitor the first area 116 of the loading dock 106. For example, the first field of view 124 of the first sensor 120 of the illustrated example covers an area of the interior 110 of the building 102 (e.g., an entire area of the deck 114), an area at the doorway 104, and an area of the exterior 112 of the building 102. In some examples, to detect a body on the deck 114, the first sensor 120 of the illustrated example monitors an area of the interior 110 of the building 102 covering an area defined by a perimeter of the deck 114. In some examples, the first sensor 120 monitors a status of the door 108 (e.g., an open or closed position). In some examples, the first sensor 120 monitors an area of the exterior 112 of the building 102 adjacent the doorway 104 to detect a presence of a vehicle 126 at the loading dock 106. In some examples, a sensor (e.g., a proximity sensor or switch) detects the status or position of the door 108.

The second sensor 122 (e.g., an optical sensor) of the illustrated example provides a second field of view 128 (e.g., a two-dimensional field of view) to monitor the second area 118 of the loading dock 106. The second area 118 of the illustrated example is adjacent the doorway 104. For example, the second area 118 may include a width 130 that is substantially similar to a width (e.g., between approximately 2 feet and 4 feet greater than a width of a door 108) and a length 132 (e.g., 2 to 4 feet) from the doorway 104 in a direction toward a rear 114a of the deck 114. Thus, the second area 118 of the illustrated example is immediately adjacent the doorway 104 and extends and/or includes only a portion of the deck 114 (e.g., a portion of a length between a front edge 114b of the deck 114 adjacent the doorway 104 and the rear edge 114a). Thus, the second area 118 of the illustrated example is less than the first area 116. To detect the body 136 and/or an ascent of the deck 114, in some examples, the field of view 128 is defined by one or more beams that lie above and/or generally parallel to the deck 114 when the deck 114 is at a lowered, cross-traffic position (e.g., within plus or minus 5 degrees from normal). In some examples, there is a plurality of beams to monitor the second area 118 above the deck 114. In some examples, there is a single beam provided by the second sensor 122 that scans and/or translates (e.g., horizontally) across the second area 118 above the deck 114.

In operation, the field of view 124 of the first sensor 120 changes a sensed characteristic or pattern of interruption based on the presence or absence of, for example, the position of the door 108, the body 136 on the deck 114, the vehicle 126 at the loading dock 106 and/or the position (e.g., an elevation) of the deck 114 relative to the floor 138. For example, a characteristic or pattern of the field of view 124 changes from a non-triggered (e.g., normal) state when the door 108 is in a open position, the body 136 is absent from the deck 114, the vehicle 126 is absent from the loading dock 106, and/or the deck 114 is in a stored or cross-traffic position (e.g., substantially parallel relative to the floor 138) to a triggered state when the door 108 is in the closed position 206, the body 136 is present on the deck 114, the vehicle 126 is present at the loading dock 106, and/or the deck 114 is in an elevated position relative to the floor 138 (e.g., at an incline or non-parallel orientation relative to the floor 138). In some examples, the term "triggered state" refers to the output or reaction of the first sensor 120 when the first sensor 120 detects a certain interruption in the field of view 124, where the interruption includes, for example, the door 108 being in the closed position, the deck 114 having moved to the raised position, the vehicle 126 being present at the loading dock 106, and/or the body 136 being on the deck 14. In examples where the first sensor 120 is a camera or 3D imaging scanner, the first sensor 120 is in a triggered state when the captured and analyzed image indicates that the door 108 is in a closed position, the vehicle 126 is present at the loading dock 106, the deck 114 is in an elevated position, and/or the body 136 is present in the first area 116 of the deck 114. The first sensor 120 is in a non-triggered state when the captured and analyzed image indicates that the door 108 is in the open position 110, the vehicle 126 is absent from the loading dock 106, the deck 114 is in a cross-traffic position, and/or the body 136 is not detected in the first area 116 of the deck 114. In examples where the first sensor 120 is a photoelectric eye or similar device, the first sensor 120 is in the non-triggered (e.g., normal) state when one or more beams of the field of view 124 is unobstructed or in an uninterrupted state (e.g., the beams are not interrupted by either the deck 114 at an elevated position or the body 136 present in the first area 116 of the deck 114). In examples where the first sensor 120 is a photoelectric eye or a similar device, the first sensor 120 is in the triggered state when one or more of the beams is obstructed in a pattern or characteristic indicative of the deck 114 being at or above the cross-traffic position, the vehicle 126 is present, and/or the body 136 is in the first area 116 of the deck 114.

Similarly, the field of view 128 of the second sensor 122 changes a sensed characteristic or pattern of interruption based on the presence or absence of, for example, the body 136 on the deck 114 and within the second area 118. For example, a characteristic or pattern of the field of view 128 changes from a non-triggered (e.g., normal) state when the body 136 is not present in the second area 118 of the deck 114 to a triggered state when the body 136 is present in the second area 118 of the deck 114. In some examples, the term "triggered state" refers to the output or reaction of the second sensor 122 when the second sensor 122 detects a certain interruption in the field of view 128, where the interruption includes, for example, the body 136 being present in the second area 118 of the deck 114. In examples where the second sensor 122 is a camera or 3D imaging scanner, second sensor 122 is in a triggered state when the captured and analyzed image indicates that the body 136 is present in the second area 118 of the deck 114, and the second sensor 122 is in a non-triggered state when the captured and analyzed image indicates that the body 136 is not present in the second area 118 of the deck 114. In examples where the second sensor 122 is a photoelectric eye or similar device, the second sensor 122 is in the non-triggered (e.g., normal) state when one or more beams of the field of view 128 is unobstructed or in an uninterrupted state (e.g., the beams are not interrupted by the body 136 not present in the second area 118 of the deck 114). In examples where the second sensor 122 is a photoelectric eye or a similar device, the second sensor 122 is in the triggered state when one or more of the beams is obstructed in a pattern or characteristic indicative of the body 136 present in the second area 128 of the deck 114.

To enable monitor, detect and/or determine conditions at the loading dock based on signals (e.g., reactive signals) provided by the first sensor 120 and/or the second sensor 122, the example dock leveler system 100 of FIG. 1 employs a controller 134. The controller 134 of the illustrated example receives signals from the first sensor 120 and/or the second sensor 122 to determine and/or analyze conditions at the loading dock 106. The controller 134 is schematically illustrated to represent any suitable controller. The term, "controller" refers to a logic circuit (e.g., wiring, relays, IC circuit, computer, programmable logic controller, etc.) that emits or generates a visual signal, an audible signal and/or a machine actuating signal in response to receiving input from the first sensor 120 and/or the second sensor 122, a manual input device (e.g., a push button), and/or other devices (e.g., electromechanical limit switches) communicatively coupled (e.g., via a network, wire, Bluetooth, etc.). In some examples, the controller 134 processes and/or analyzes information based on one or more signals from the first sensor 120 and/or the second sensor 122 and causes an output such as, for example, generating an audible signal or visual signal 135, preventing movement of the deck, generating an illuminated signal or visual indicator, etc. In some examples, the controller 134 activates a warning provided by an overhead light 137 that illuminates the second area 118 and/or other areas of the deck 114 to indicate a hazardous condition and/or to provide a warning when a body 136 is detected in the second area 118. For example, the light 137 may illuminate the deck 114 and/or project indicia and/or an image on the deck 114 (e.g., within the first area 116 and/or the second area 118). The indicia may include text and/or an image such as, for example, caution, stop, falling hazard, and/or any other indicia or text to provide a warning. In some examples, the light 137 may project a symbol, image and/or shape such as a stop sign or yield sign, which may or may not include indicia or text such as, for example, stop or yield, respectively. In some examples, if the first sensor 120 detects that the door 108 is in an open position and the vehicle 126 is not present at the loading dock 106, and second sensor 122 detects a presence of a body (e.g., a person) within the second area 118, the dock leveler system 100 and/or the controller 134 may initiate an alarm (e.g., an audible warning), prevent operation of the deck 114, etc. In some examples, the controller 134 prevents the door from opening to the open position 110 when a body is detected in the second area 118 and the vehicle 126 is not present at the loading dock 106 (i.e., adjacent the doorway 104.

In the illustrated example of FIG. 1, the first sensor 120 and/or the controller 134 of the illustrated example determines (e.g., based on the characteristic of the interruption of the field of view 124 of the first sensor 120) a first condition at the loading dock 106 including, for the example, the status of the door 108 (e.g., in the open position) and the presence of the vehicle 126 backed up at the loading dock 106. Under the conditions of the illustrated example, the controller 134 may determine that there may be no need for an alarm because the presence of the vehicle 126 at the loading dock 106 minimizes or eliminates the possibility of the body 136 (e.g., personnel, a forktruck, etc.) falling off the deck 114 and onto a driveway outside of the building 102. In some examples, if neither the first sensor 120 nor the second sensor 122 detects a body within the respective first area 116 and the second area 118, the controller 134 enables operation of the deck 114 to move the deck 114 to a loading position relative to the vehicle 126 (e.g., as shown in FIG. 4). When the controller 134 causes actuation of the deck 114 and the deck 114 moves toward an operative position (e.g., upward away from a floor 138), the second sensor 122 of the illustrated example may be disabled and/or the signals generated by the second sensor 122 may be ignored by the controller 134.

FIG. 2 illustrates an example condition 200 detected by the example dock leveler system 100 of FIG. 1. As shown in FIG. 2, the deck 114 is in a lowered or stored position (e.g., cross-traffic position) with a lip 202 of the deck 114 in a retracted or pendant position. In this example, lip keepers 204 help support the weight of the lip 202 and/or the deck 114. In the illustrated example of FIG. 2, the door 108 is in a closed position 206 blocking access through the doorway 104 between the interior 112*a* and the exterior 112*b* of the building 102. The door 108, when in the closed position 206 as shown in FIG. 2, interrupts and/or obstructs the field of view 124 of the first sensor 120. Based on the characteristic of the interruption of the field of view 124 of the first sensor 120, the controller 134 determines that the door 108 is in the closed position 206 and the deck 114 is positioned in a lowered, cross-traffic position. In addition to or as an alternative to the first sensor 120, in some examples, a door sensor (e.g., a proximity sensor, a switch, etc.) determines if the door 108 is in the closed position 206 or the open position 110 (FIG. 1). The second sensor 122 of the illustrated example monitors the second area 118 adjacent the doorway 104. In some examples, when the door 108 is in the closed position 206 as shown in FIG. 2, and a body is detected in the second area 118, the controller 134 may prevent the door 108 from moving to the open position 110 to prevent a threat or personnel falling from the doorway 104 and onto a driveway 208 of the loading dock 106 when the controller 134 determines the vehicle 126 is not present at the doorway 104. In some examples, the controller 134 provides a visual and/or audible signal indicating a condition(s) such as, for example, the deck 114 being in the cross-traffic position and/or the door 108 being in the closed position 206, and/or a body detected in the second area 118.

Figure 3:
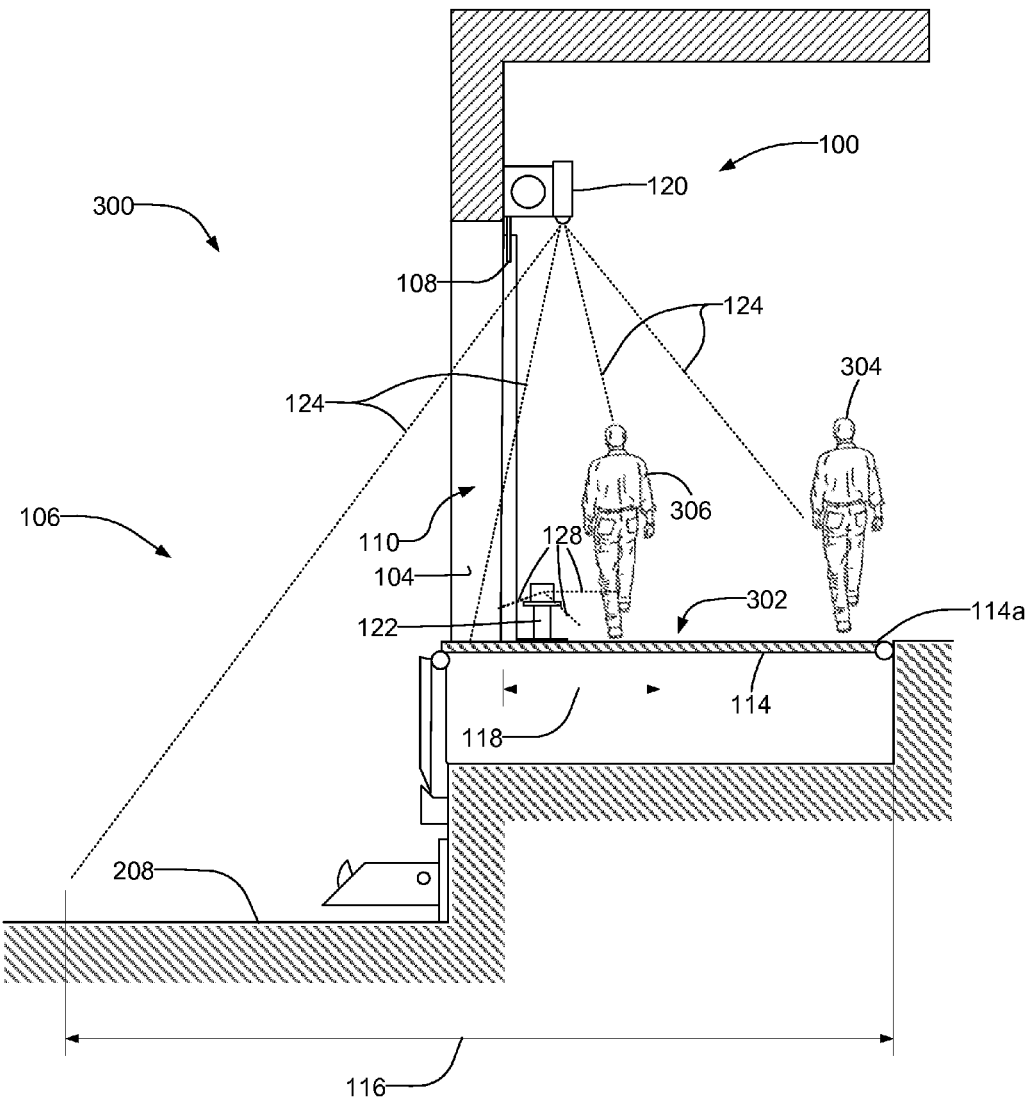
FIG. 3 is a side view of the example loading dock of FIG. 1 but showing the door of the example loading dock in an open position.

FIG. 3 illustrates another example condition 300 detected by the example dock leveler system 100. In the illustrated example of FIG. 3, the first sensor 120 monitors the first area 116 of the loading dock 106 to detect that the door 108 is in the open position 110. With the door 108 in the open position, the field of view 124 of the first sensor 120 extends through the doorway 104 toward the driveway 208 of the loading dock 106. The first sensor 120 and/or the controller 134 of the illustrated example (e.g., based on the characteristic of the interruption of the field of view 124 of the first sensor 120) detects or determines that the door 108 is in the open position 110. Additionally, the first sensor 120 and/or the controller 134 of the illustrated example (e.g., based on the characteristic of the interruption of the field of view 124 of the first sensor 120) detects or determines that a vehicle (e.g., the vehicle 126 of FIG. 1) is not present at the loading dock 106. In addition, the first sensor 120 and/or the controller 134 of the illustrated example (e.g., based on the characteristic of the interruption of the field of view 124 of the first sensor 120) detects or determines that the deck 114 is in a lowered position 302 (e.g., a cross-traffic position) as shown, for example, in FIG. 3. The lowered position 302 of the illustrated example includes an incline angle of the deck 114 relative to the floor 138 of between approximately −5 degrees and 30 degrees. In some examples, a lowered position or a cross-traffic position as described herein includes an angle of elevation of the deck 114 sufficient to enable personnel or material handling equipment to traverse the deck 114 between the rear edge 114*a* and the front edge 114*b*. In some examples, the cross-traffic position and an angle of the deck 114 within a threshold angle includes a position of the deck 114 between the lowered position 302 and an operative position 500 of FIG. 5.

In some examples, the first sensor 120 and/or the controller 134 of the illustrated example (e.g., based on the characteristic of the interruption of the field of view 124 of the first sensor 120) detects the presence of a body 304 on the deck 114. In the illustrated example, the body 304 is within the first area 116 and outside of field of view 128 representative of the second area 118. For example, the body 304 of the illustrated example is detected adjacent the rear edge 114a of the deck 114. In some examples, the controller 134 prevents operation of the deck 114 toward an operative position (e.g., an upward direction in the orientation of FIG. 3) when the first sensor 120 and/or the controller 134 detect the first body 304 in the first area 116. However, the controller 134 may not initiate the alarm 135 or light 137 because the body 304 is not within the second area 118. Additionally, when the door 108 is in the open position 110 as shown in FIG. 3, the second sensor 122 monitors the second area 118 adjacent the doorway 104 for the presence of a body 306. If the second sensor 122 and/or the controller 134 of the illustrated example (e.g., based on the characteristic of the interruption of the field of view 128 of the second sensor 122) detects the body 306 within the second area 118, the second sensor 122 and/or the controller 134 may cause the alarm 135 and/or the light 137 to activate and/or may prevent operation of the deck 114 toward an operative position (e.g., an upward direction in the orientation of FIG. 3). Thus, in some examples, although the first sensor 120 detects the presence of the body 304 in the first area 116, the controller 134 only initiates the alarm 135 and/or the light 137 when the body 306 is detected within the second area 118 adjacent the doorway 104.

FIG. 4 illustrates another condition(s) 400 that may be detected by the dock leveler system 100. For instance, the detected condition 400 of the illustrated example includes the deck 114 being at the lowered position 302 (e.g., a cross-traffic position), an obstructive body 402 is positioned or present on the deck 114 within the first area 116, the door 108 is in the open position 110, and a cargo door 404 of the vehicle 126 is in an open position 406. The condition(s) 400 creates a characteristic or pattern of interruption of the field of view 124 that enables the first sensor 120 and/or the controller 134 to detect or determine the presence of the body 402 on the deck 114, the presence of the vehicle 126 at the loading dock 106, and the cargo door 404 in the open position 406. In some examples, the first sensor 120 determines if the cargo door 404 is in a closed position. In some such examples, the controller 134 emits an audible and/or visual signal indicating that the cargo door 404 is in a closed position. In some examples, when the first sensor 120 detects the vehicle 126 at the loading dock 106 (e.g., within between 6-12 inches of the doorway 104), the controller 134 may cause the vehicle restraint 408 to restrain the vehicle 126.

As shown in the example of FIG. 4, a vehicle restraint 408 is actuated to engage or restrain a rear impact guard 410 of the vehicle. In some examples, the dock leveler system 100 employs a signal from the vehicle restraint 408 to determine or detect the presence of the vehicle 126 at the loading dock 106 instead of a signal provided by the first sensor 120. In some examples, the dock leveler system 100 employs a signal provided by the vehicle restraint 408 in addition to a signal provided by the first sensor 120 to confirm or determine the presence of the vehicle 126 at the loading dock 106. For example, when the vehicle restraint 408 is activated (e.g., having a hook 412 engaged with the rear impact guard 410), the controller 134 may receive a signal from a sensor (e.g., a switch or proximity sensor) of the vehicle restraint 408 to indicate that the vehicle 126 is retrained. In some examples, a wheel chock system may be employed to restrain the vehicle at the loading dock 106. In some such examples, the controller 134 may receive a signal from the wheel chock system that is indicative of the vehicle 126 being in a restrained position. In some examples, the dock leveler system 100 and/or the controller 134 may determine the presence of the vehicle 126 at the loading dock via a sensor 412 (e.g., a motion detector) positioned at the exterior 112b of the building 102 to enable detection of the vehicle 126, for example, when the door 108 is in the closed position 206.

In the illustrated example, when the vehicle 126 is detected at the loading dock 106 and/or the vehicle 126 is restrained by the vehicle restraint 408, the controller 134 may inactivate the second sensor 122 and/or may ignore signals provided by the second sensor 122. Thus, a body detected in the second area 118 by the second sensor 122 will not initiate or cause the controller 134 to initiate an alarm or warning when the vehicle 126 is present at the loading dock 106.

Additionally or alternatively, in addition to detecting the vehicle 126 at the loading dock 106 and/or the vehicle restraint 408 engaged (e.g., restraining) the vehicle 126, the first sensor 120 and/or the controller 134 of the illustrated example detect the body 402 (e.g., cargo, an obstruction) on the deck 114 within the first area 116 (e.g., adjacent a rear end of the deck). In some instances, the body 402 can interfere with normal loading operations. Although a body is not detected in the second area 118 by the second sensor 122, the first sensor 120 detects the body 402 in the first area 116. In some such examples, the controller 134 of the illustrated example prevents the deck 114 from rising or moving toward an upright position (e.g., an operative position 500 of FIG. 5) until the first sensor 120 detects that the body 402 is not present on the deck 114. Thus, the controller 134 may prevent operation of the deck 114 until the body 402 is removed from the first area 116.

Figure 5:
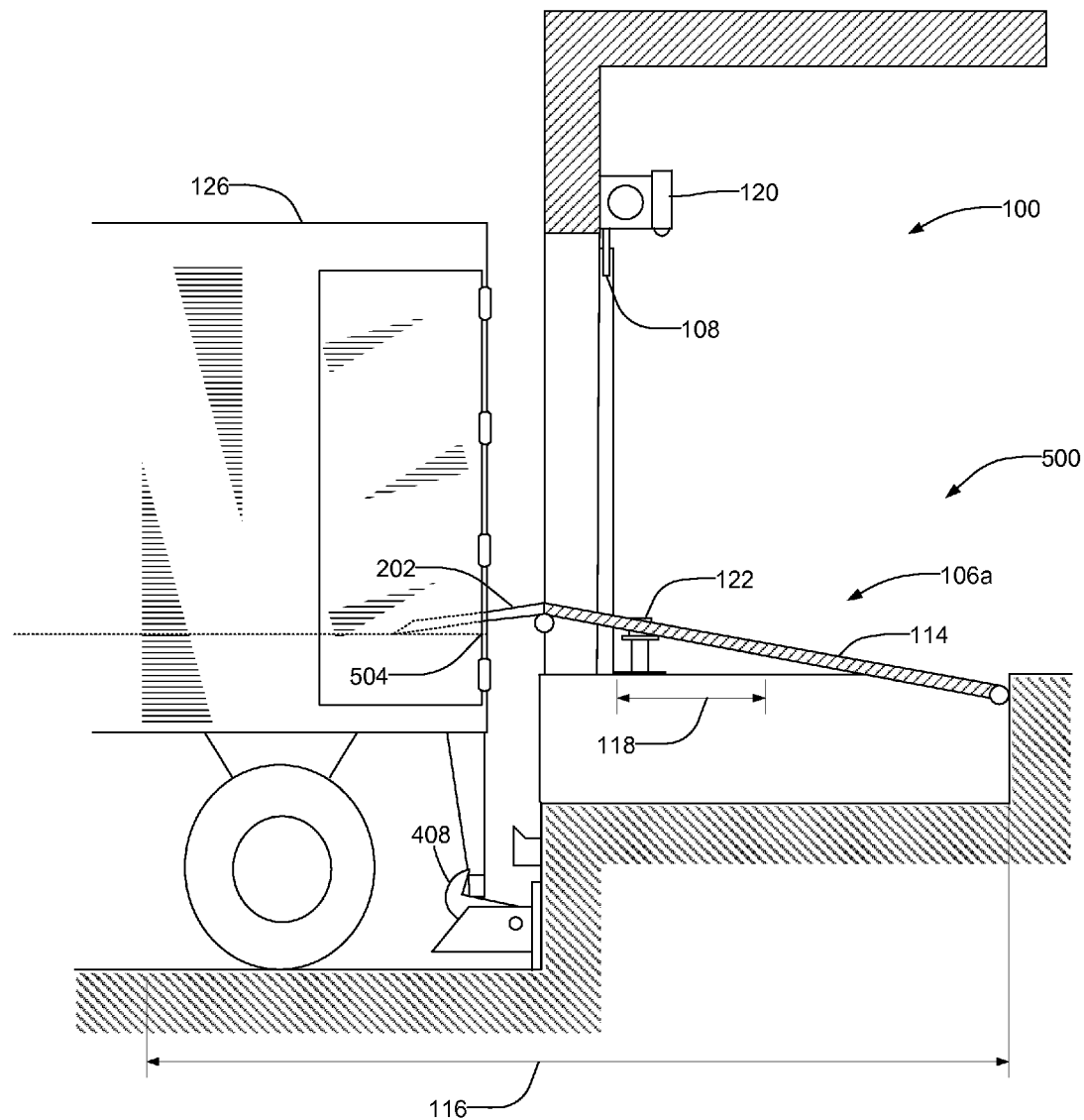
FIG. 5 is a side view of the example loading dock of FIG. 1 showing a deck of the loading dock in an operative position relative to the vehicle.

FIG. 5 shows that after removing the body 12, the deck 114 is in an operative position 500 (e.g., deployed) in preparation for loading and/or unloading the vehicle 126 of cargo. In some examples, when the first sensor 120 and the second sensor 122 do not detect the presence of a body in the respective first area 116 and the second area 118, and the first sensor 120 and/or the controller 134 determine that the vehicle 126 is present at the loading dock 106 and/or restrained by the vehicle restraint 408, the controller 134 causes an actuator (e.g., a hydraulic cylinder, a linear motor, etc.) to raise the deck 114 until the first sensor 120 determines that the deck 114 is at a predetermined raised position. The predetermined position should be sufficiently high to allow the extension of the lip 202 out away from the deck 114 and over a lower rear edge 504 of the vehicle 126. The first sensor 120 and/or the controller 134 determines when the deck 114 is at the predetermined raised position based on a characteristic or pattern of interruption of the field of view 124 provided by the first sensor 120. Once the controller 134 determines that the deck 114 has moved to the predetermined raised position, in some examples, the controller 134 (e.g., automatically) commands the lip 202 to extend or deploy. For example, the controller 134 commands or operates an actuator operatively coupled to the lip 202 to deploy and retract the lip 202. In some examples, the first sensor 120 senses whether the lip 202 is extended based on the lip's interruption of the field of view 124 provided by the first sensor 120. After the lip 202 is (e.g., fully) extended via, for example, an actuator (e.g., a hydraulic cylinder, a linear motor, etc.), the deck 114 is lowered from the predetermined raised position to the operative position 500 as shown in FIG. 5. In the example shown in FIG. 5, the first sensor 120 and/or the controller 134 of the illustrated example determines that the deck 114 is properly deployed for cargo loading and/or unloading operations. In some examples, the controller 134 responds to the first sensor 120 by emitting a signal that indicates the dock leveler 106a is ready for use.

Figure 6:
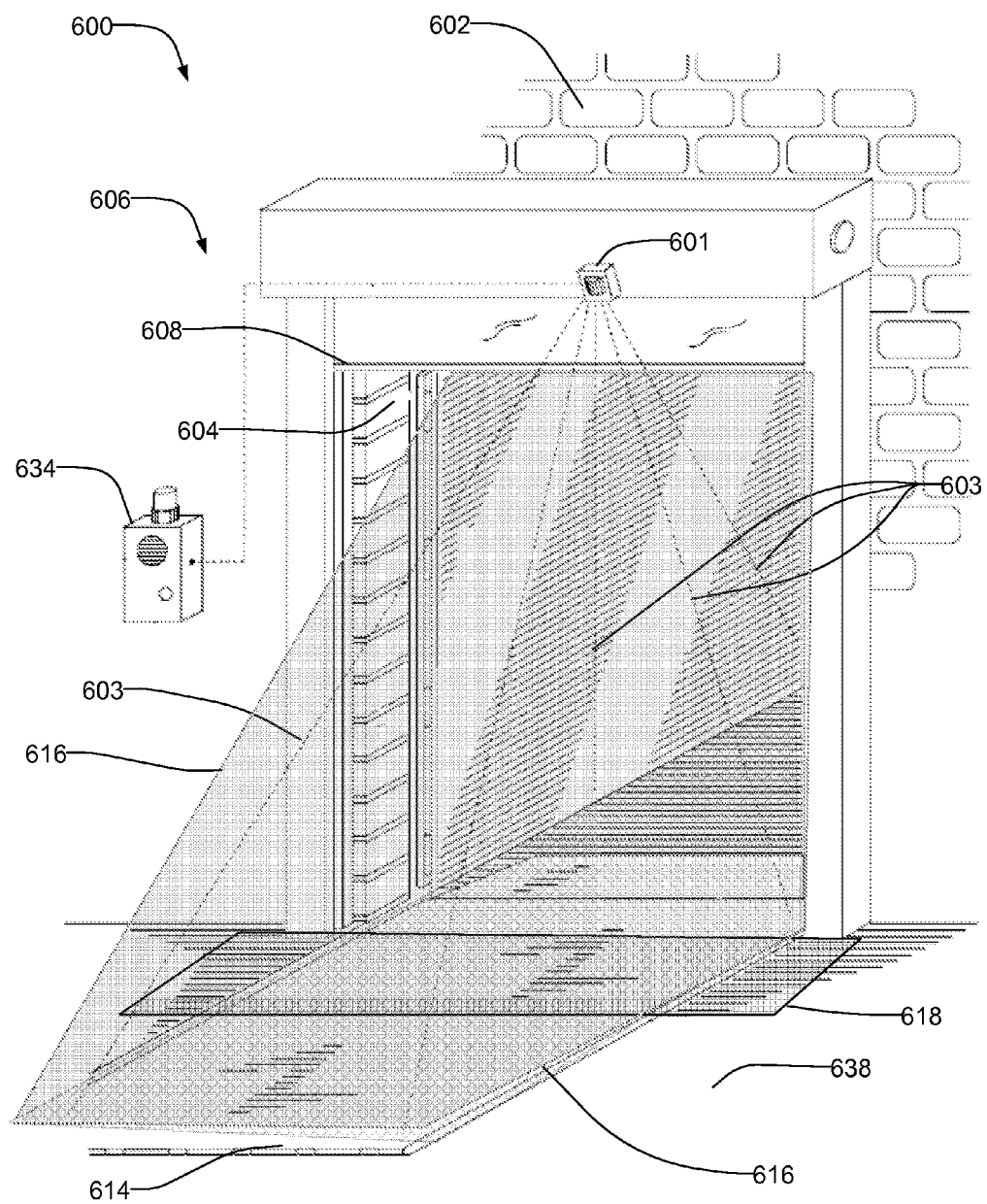
FIG. 6 is a perspective view of another example dock leveler system constructed in accordance with the teachings disclosed herein.
Figure 7:
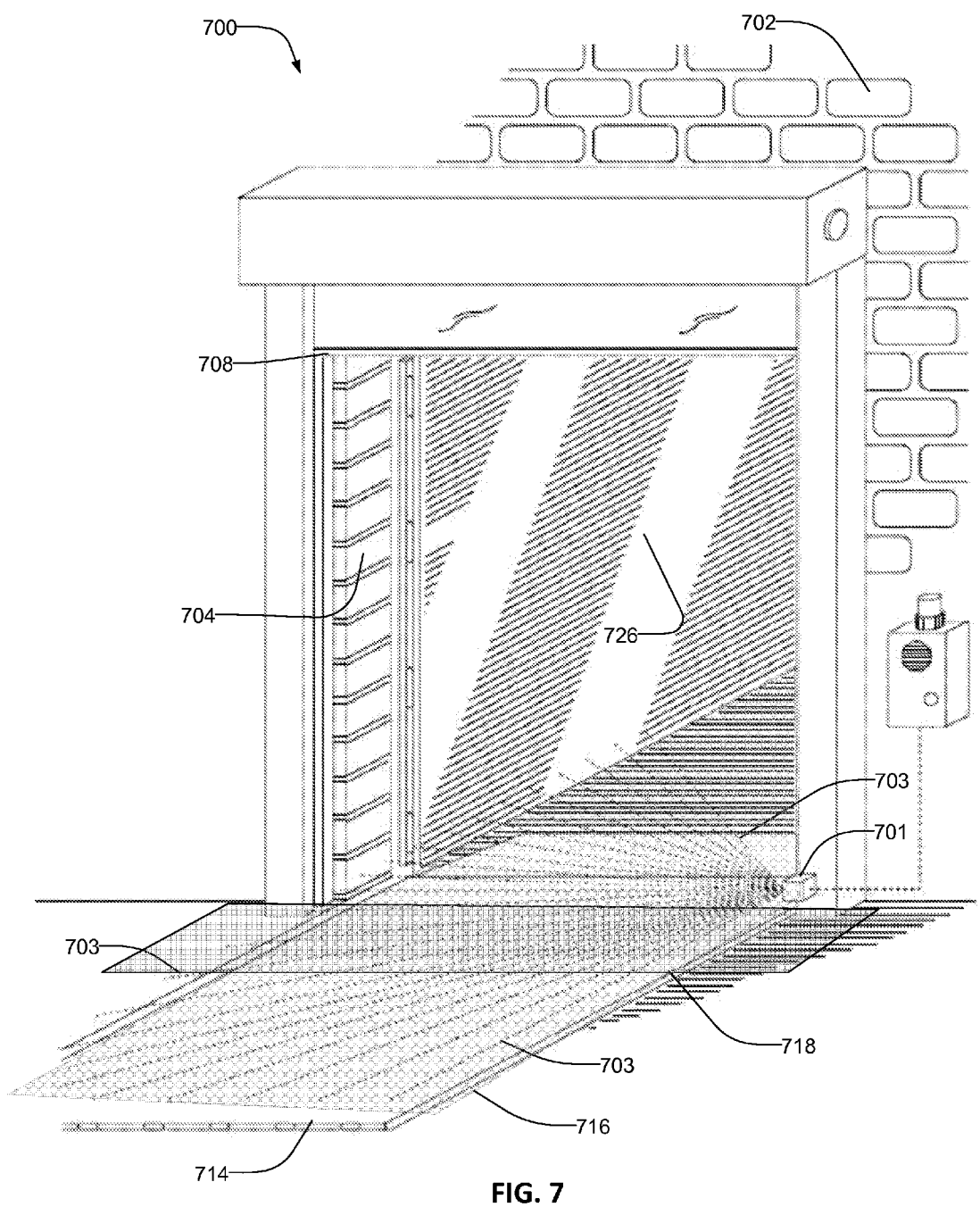
FIG. 7 is a perspective view of another example dock leveler system constructed in accordance with the teachings disclosed herein.

FIGS. 6 and 7 illustrate other example dock leveler systems 600 and 700 constructed in accordance with the teachings disclosed herein. Those components of the example dock leveler systems 600 and 700 that are substantially similar or identical to the components of the example dock leveler system 100 described above in connection with FIGS. 1-5 and that have functions substantially similar or identical to the functions of those components will not be described in detail again below. Instead, the interested reader is referred to the above corresponding descriptions. To facilitate this process, similar reference numbers will be used for like structures.

Referring to FIG. 6, the example dock leveler system 600 of FIG. 6 includes a sensor 601 (e.g., an elevated sensor) to monitor a first area 616 and a second area 618. In the illustrated example, the sensor 601 (e.g., an optical sensor) provides a field of view 603 (e.g., three-dimensional field of view) to monitor the first area 616 and the second area 618. The field of view 603 of the illustrated example covers a deck 614 (e.g., an entire perimeter of the deck 614, an area through the doorway 604, and an area outside of a building 602 through the doorway 604 when a door 608 is in an open position). The first area 616 is greater than the second area 618 and the first area 616 of the illustrated example overlaps the second area 618. The second area 618 is adjacent a doorway 604. The sensor 601 is communicatively coupled to a controller 634 that determines one or more conditions at a loading dock 606 including, but not limited to, an open or closed position of a door 608, a presence of a vehicle 626 at a loading dock 606, an elevation of a deck 614 relative to a floor 638, and/or a presence of a body in the first area 616 and/or the second area 618. In some examples, the sensor 601 emits and/or receives one or more beams of electromagnetic radiation (e.g., visible light, invisible light, infrared, laser, microwave, thermal, etc.) through its field of view 603. In some examples, one or more beams of the sensor 601 extend through and/or sweep across the field of view 603 including, for example, the first area 616 and the second area 618. In some examples, the controller 634 provides a visual and/or audible signal in response to detecting the one or more condition(s). Examples of such conditions include one or more conditions illustrated in connection with FIGS. 1-5.

Referring to FIG. 7, the example dock leveler system 700 includes a sensor 701 (e.g., a lower sensor) to monitor a first area 716 and a second area 718. The sensor 701 of FIG. 7 provides with a (e.g., two-dimensional) field of view 703 to monitor the first area 716 and the second area 718 of the loading dock 706a. In addition or alternatively, a field of view 703 generated by the sensor 701 provides one or more lines of coverage over a deck 714. The field of view 703 of the illustrated example covers a deck 714 (e.g., an entire perimeter of the deck 714, an area through the doorway 704, and an area outside of a building 702 through the doorway 704 when a door 708 is in an open position). The first area 716 is greater than the second area 718 and the first area 716 of the illustrated example overlaps the second area 718. The second area 718 is adjacent a doorway 704. The sensor 701 is communicatively coupled to a controller 734. In some examples, to detect a body in the first area 716 or the second area 718, in some examples, the field of view 703 is defined by one or more beams that lie above and/or generally parallel to the deck 714 when the deck 714 is at the lowered, cross-traffic position. In some examples, the field of view 703 extends through the doorway 704, and/or into a vehicle 726 (e.g., a cargo bay of the vehicle 726). In some examples, a single beam provided by the sensor 701 scans and/or translates (e.g., horizontally) across the first area 716 and the second area 718 above the deck 714. Depending on the extent, characteristic or pattern to which the deck 714, the door 704, a body and/or the vehicle 726 interrupts the field of view 703, the sensor 701 and/or the controller 734 determines various conditions at the loading dock 10. In some examples, the controller 734 provides a visual and/or audible signal in response to detecting the one or more condition(s). Examples of such conditions include one or more conditions illustrated in connection with FIGS. 1-5.

The first sensor 120 and the second sensor 122 of FIG. 1, the sensor 601 of FIG. 6 and/or the sensor 701 of FIG. 7 are schematically illustrated and may represent a sensor capable of monitoring 2D and/or 3D areas. Examples of the first sensor 120, the second sensor 122, the sensor 601 and/or the sensor 701 include, but are not limited to, a 3D imaging sensor (e.g., as provided by IFM Electronic of Essen, Germany), a still camera with image analytics, a video camera with video analytics, an ultrasonic sensor, a photoelectric eye, a 2D or 3D scanner, etc. Examples of the first sensor 120, the second sensor 122, the sensor 601 and/or the sensor 701 operate under principles, examples of which include, but are not limited to, active infrared, passive infrared, ultrasonic, radar, microwave, laser, electromagnetic induction, ultra-IR LED, time-of-flight pulse ranging technology, photoelectric, thermal imaging, video analytics, and/or various combinations thereof. Some examples of the first sensor 120, the second sensor 122, the sensor 601 and/or the sensor 701 include, but are not limited to, a model BEA LZR, a model BEA Sparrow, a model BEA Falcon, a model LZR-i100, a model BEA LZR-i30, a model UC4000 Ultrasonic Sensor, and a model R2100 Multi-Beam LED Scanner. The BEA LZR examples are products of BEA Industrial of Belgium, and the R2100 and the UC400 examples are products of Pepperl & Fuchs of Germany.

Figure 8:
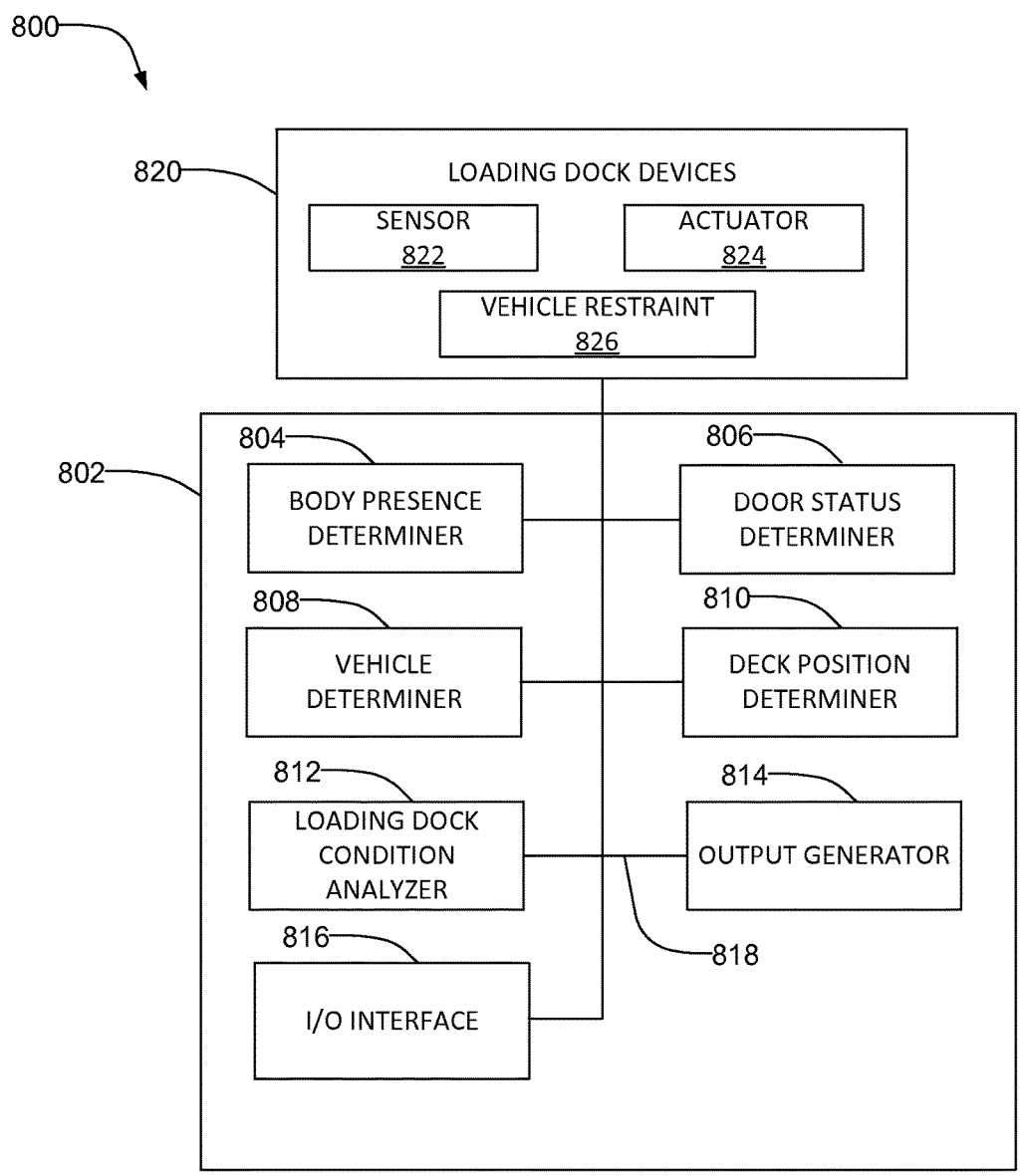
FIG. 8 is a block diagram of an example dock leveler controller constructed in accordance with the teachings of this disclosure.

FIG. 8 depicts a controller 802 that may be used to implement the example disclosed herein. For example, the controller 800 of the illustrated example may be used to implement the controller 134 of FIGS. 1-5, the controller 634 of FIG. 6, and/or the controller 734 of FIG. 7. The controller 802 of the illustrated example includes a body presence determiner 804, a door status determiner 806, a vehicle determiner 808, a deck position determiner 810, a loading dock condition analyzer 812, an output generator 814, and an input/output interface 816. The body presence determiner 804, the door status determiner 806, the vehicle determiner 808, the deck position determiner 810, the loading dock condition analyzer 812, the output generator 814 and the input/output interface 816 of the illustrated example are in communication via a communication bus 818.

In this example, the controller 802 is communicatively coupled to one or more loading dock devices 820 such as, for example, a sensor 822 (e.g., the sensor 120, 122, 601, 701), an actuator 824 (e.g., a deck actuator, a lip actuator, etc.) that actuates a deck (e.g., the deck 114, 614, 714) and/or a lip (e.g., the lip 202), a vehicle restraint 826 (e.g., the example vehicle restraint 408), a sensor to detect a position (e.g., the upright position or the lowered operative position) of the deck 114, the sensor 412 of FIG. 4, and/or any other device that may be used in conjunction with the example loading dock 106 of FIGS. 1-5, the loading dock 606 of FIG. 6, and/or the loading dock 706 of FIG. 7. The input/output interface 816 of the illustrated example communicatively couples the example controller 802 to one or more loading dock devices 820.

In some examples, the controller 802 receives and/or analyzes a signal provided or generated by the sensor 822 (e.g., the first sensor 120, the second sensor 122, the sensor 601, the sensor 701) to determine, define, interpret, and/or analyze a condition of a loading dock 106, 606, 706. For example, the sensor 820 of the illustrated example detects information related to a condition of a loading dock and communicates the information to the controller 802 via the input/output interface 816. In some examples, the condition is based on a presence of an object (e.g., a body, personnel, etc.) positioned on a deck, a deck moving to an upright position, extending or retracting of a lip, a status or position of a door of the loading dock (e.g., a dock door), a presence of a vehicle at the loading dock, a cargo door of a vehicle, and/or any other condition of a loading dock.

For example, the sensor 822 (e.g., the sensor 120, 122, 601, 701) may be a 3D imaging scanner that captures and/or characterizes a spatial arrangement data of objects and/or known machinery or devices of the loading dock such as, for example, a status or position of the door 108, 608, 708, a position of the deck 114, 614, 714, the presence of the body 136, 304, 304, 402 in the first area 116, 616, 716 of the loading dock 106, 606, 706, the presence of the body 136, 304, 304, in the second area 118, 618, 718 of the loading dock, the presence of the vehicle 126 at the loading dock, a status or condition of the vehicle restraint 408, 826, etc. In some such examples, the controller 802 (e.g., the controller 134, 634, 734) converts the spatial arrangement data to positional information of portions of the loading dock, a presence of objects on a deck (e.g., the deck 14), a status of a door, and/or a presence of a vehicle at the loading dock. In some examples, the sensor data is captured by a photoelectric eye or a similar device. In some such examples, the sensor 822 (e.g., the sensor 120, 122, 601, 701) provides or generates a field of view (e.g., the field of views 124, 128, 603, 703) and based on an interruption pattern of the field of view, the controller 802 (e.g., the controller 134, 634, 734) converts the interrupted pattern to positional information of portions of the loading dock, a presence of objects on a deck (e.g., the deck 14), a status of a door, and/or a presence of a vehicle at the loading dock. The sensor data of the illustrated example may be captured periodically (e.g., every five seconds) or continuously (e.g., every millisecond). In some examples, the sensor data is received based on event-triggers such as a detection of the door 108, 608, 708 being in the open position 110.

For example, based on a signal received from the sensor 822 via the input/output interface 816, the door status determiner 806 of the illustrated example determines a state or position of a door (e.g., the door 108, 608, 708) of a loading dock (e.g., the loading dock 106, 606, 706). In some examples, the body presence determiner 804 communicates the status or position of the door to the loading dock condition analyzer 812. Depending on the status of the door determined by the door status determiner 806, the loading dock condition analyzer 812 may instruct or otherwise cause the body presence determiner 804 to detect or determine a presence of a body in a first area (e.g., the first area 116, 616, 716) of a loading dock and/or a second area (e.g., the second area 118, 618, 718) of a loading dock. For example, the loading dock condition analyzer 812 may instruct or otherwise cause the body presence determiner 804 to determine the presence of a body in the first area or the second area of a loading dock when the door status determiner 806 determines that a door of a loading dock is in an open position (e.g., the open position 110). In some examples, the loading dock condition analyzer 812 may ignore communications from the body presence determiner 804 when the door status determiner 806 determines that the door is in a closed position (e.g., the closed position 206).

The body presence determiner 804 receives and/or analyzes signals from the sensor 822 to determine or detect the presence of a body in a first area and/or a second area of the loading dock. In some examples, the body presence determiner 804 communicates a presence or absence of a body within the first area or the second area of the door to the loading dock condition analyzer 812.

In some examples, the vehicle determiner 808 receives and/or analyzes a signal provided or generated by the sensor 822 to determine or detect the presence of a vehicle (e.g., the vehicle 126, 626, 726) at a loading dock adjacent a doorway. In some examples, the vehicle determiner 808 receives and/or analyzes a signal provided or generated by the vehicle restraint 826 (e.g., the vehicle restraint 408) to detect or determine the presence of a vehicle at the loading dock adjacent the doorway. In some examples, the vehicle determiner 808 receives and/or analyzes a signal provided by the sensor 822 and a signal provided by the vehicle restraint 826 to determine the presence of the vehicle at the loading dock. In some examples, the vehicle determiner 808 communicates a presence or absence of the vehicle at the loading dock to the loading dock condition analyzer 812.

In some examples, the deck position determiner 810 receives a signal from the sensor 822 to detect a position or elevation of a deck 114, 614, 714 relative to normal (e.g., horizontal or the floor 138). For example, the deck position determiner 810 analyzes the signal received to determine if the deck 114, 614, 714 is in a lowered position 302 (e.g., a cross traffic condition), an elevation indicative of an operation position (e.g., the operative position 500 of FIG. 5) or an elevation greater than a threshold (e.g., greater than an elevation of the operative position 500 of FIG. 5). For example, the threshold may be an incline having an angle (e.g., greater than 25 degrees) relative to normal (e.g., the floor 138) that is too steep or too high for some material handling equipment, particularly automatic guided vehicles and/or personnel to traverse. As a result, such material handling equipment and/or personnel will have difficulty traveling up the incline of the deck 114. In some examples, the vehicle determiner 808 communicates a presence or absence of the vehicle at the loading dock to the loading dock condition analyzer 812.

Based on the information provided to the loading dock condition analyzer 812 by the body presence determiner 804, the door status determiner 806, the vehicle determiner 808, the deck position determiner 810, and/or the loading dock devices 820, the loading dock condition analyzer 812 determines a condition of a loading dock. In response to detecting a certain condition at the loading dock, the example loading dock condition analyzer 812 of the illustrated example commands an output generator 814 to provide an indication (e.g., the visual and/or audible signal 52, an illuminated signal, etc.) of the condition of the loading dock. In some examples, the loading dock condition analyzer 812 signals the output generator 814 to control an actuator, for example, operatively coupled to a deck (e.g., the deck 114, 614, 714) and/or a lip (e.g., the lip 202).

In some examples, the loading dock condition analyzer 812 may instruct the output generator 814 to not initiate an alarm or alert if the body presence determiner 804 detects a presence of a body (e.g., the body 136) in the first area of the loading dock or the second area of the loading dock and the door status determiner 806 determines that a door of a doorway is in a closed position. In some examples, the loading dock condition analyzer 812 may instruct the output generator 814 to initiate an alarm (e.g., the alarm) and/or illuminate an overhead signal (e.g., the light) when the door status determiner 806 determines that a door of a loading dock is in an open position, the vehicle determiner 808 determines that a vehicle is not present at the loading dock, the deck position determiner 810 determines that the deck is in a lowered position (e.g., within a threshold angle, a cross-traffic position, etc.), and the body presence determiner 804 determines the presence of a body in a second area of the loading dock. In some examples, the loading dock condition analyzer 812 may instruct the output generator 814 to prevent or stop actuation of a deck (e.g., the deck 114, 614, 714) when the door status determiner 806 determines that a door of a loading dock is in an open position, the vehicle determiner 808 determines that a vehicle is present at the loading dock, and the body presence determiner 804 determines the presence of a body in a first area of the loading dock. In some examples, the loading dock condition analyzer 812 may instruct the output generator 814 to operate or activate the vehicle restraint 826 when the door status determiner 806 determines that a door of a loading dock is in an open position and the vehicle determiner 808 determines that a vehicle is present at the loading dock. In some examples, the vehicle determiner 808 can determine a distance of a vehicle relative to a doorway of a loading dock based on a signal received by the sensor 822 and the loading dock condition analyzer 812 instructs the output generator 814 to operate the vehicle restraint 826 when the vehicle is within a threshold distance (e.g., 6-12 inches) of the doorway.

While an example manner of implementing the controller 134 of FIGS. 1-5, the controller 634 of FIG. 6, and/or the controller 734 of FIG. 7 is illustrated in FIG. 8, one or more of the elements, processes and/or devices illustrated in FIG. 8 may be combined, divided, re-arranged, omitted, eliminated and/or implemented in any other way. Further, the example body presence determiner 804, the example door status determiner 806, the example vehicle determiner 808, the example dock position determiner 810, the example loading dock condition analyzer 812, the example output generator 814 and the example input/output interface 816 and/or, more generally, the example controller 802 of FIG. 8 may be implemented by hardware, software, firmware and/or any combination of hardware, software and/or firmware. Thus, for example, any of the example body presence determiner 804, the example door status determiner 806, the example vehicle determiner 808, the example dock position determiner 810, the example loading dock condition analyzer 812, the example output generator 814 and the example input/output interface 816 and/or, more generally, the example controller 802 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example body presence determiner 804, the example door status determiner 806, the example vehicle determiner 808, the example dock position determiner 810, the example loading dock condition analyzer 812, the example output generator 814 and the example input/output interface 816 are hereby expressly defined to include a tangible computer readable storage device or storage disk such as a memory, a digital versatile disk (DVD), a compact disk (CD), a Blu-ray disk, etc. storing the software and/or firmware. Further still, the example controller 802 may include one or more elements, processes and/or devices in addition to, or instead of, those illustrated in FIG. 8, and/or may include more than one of any or all of the illustrated elements, processes and devices.

Figure 9A:
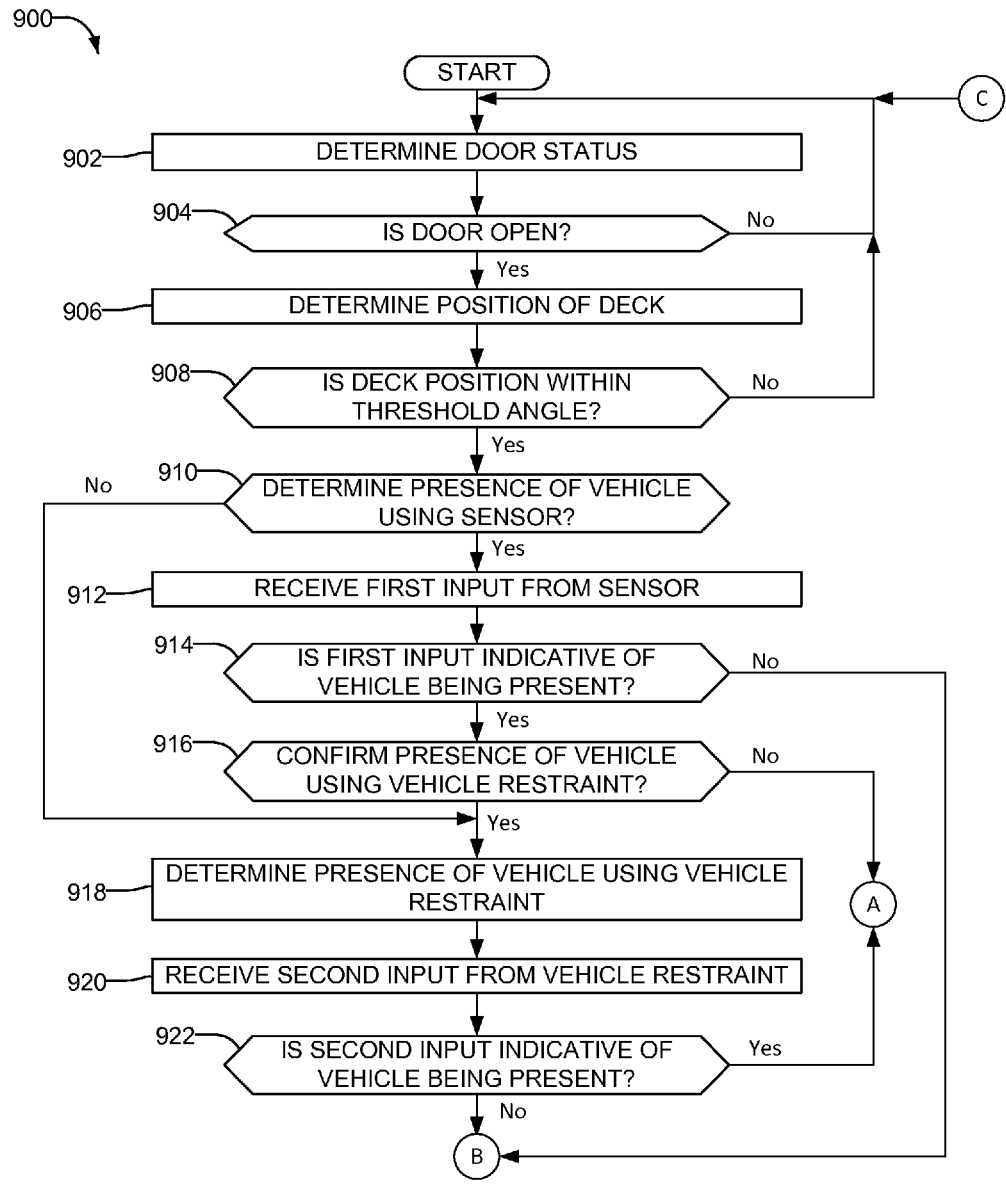
FIGS. 9A, 9B and FIG. 10 are flowcharts representative of example machine readable instructions that may be executed to monitor the example dock leveler system disclosed herein.
Figure 9B:
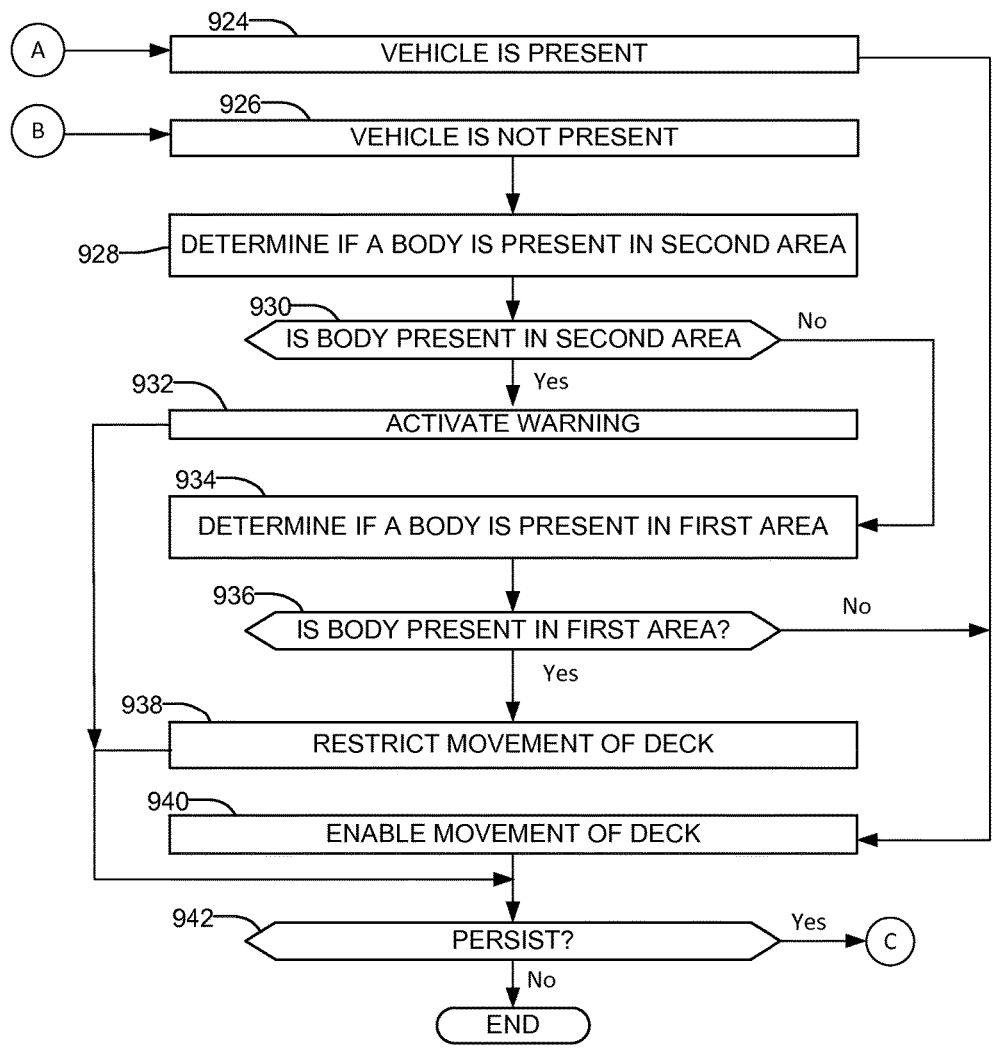
Figure 10:
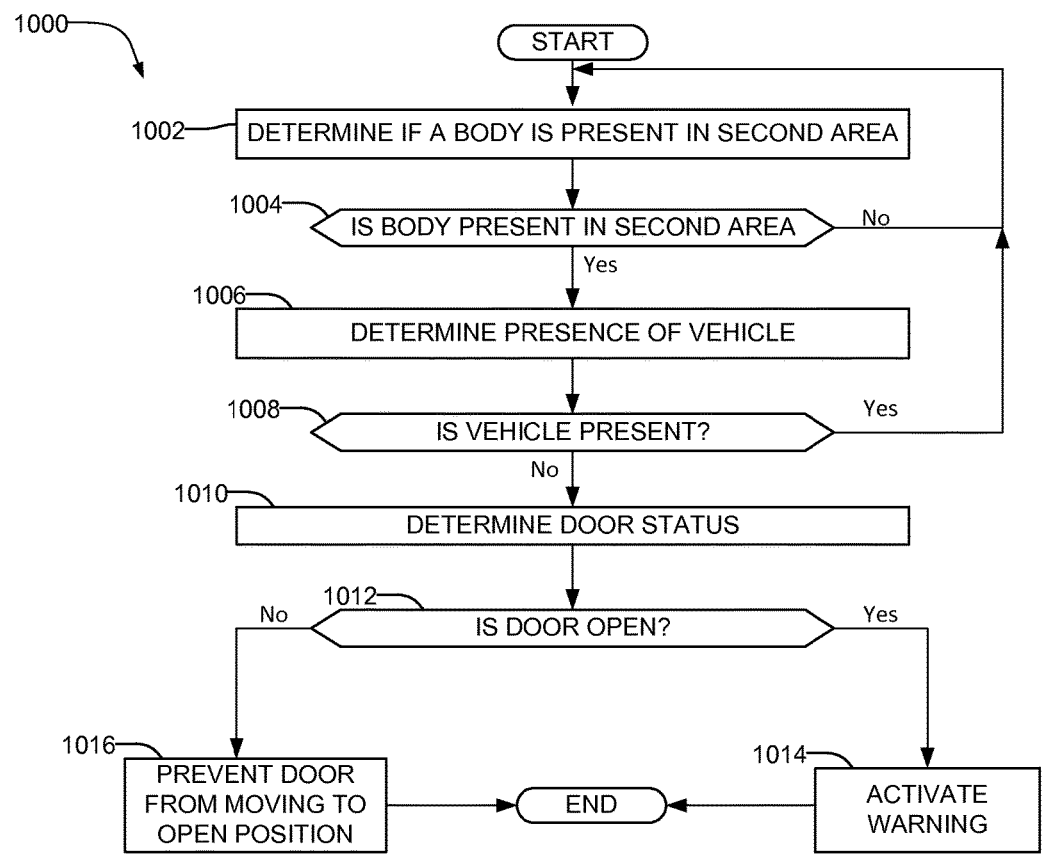

FIGS. 9A and 9b and 10 are flowcharts representative of example machine readable instructions for implementing the example controller 134 of FIGS. 1-5, the example controller 634 of FIG. 6, the example controller 734 of FIG. 7, and/or the example controller 802 of FIG. 8. In this example, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9A, 9B and 10, many other methods of implementing the example controllers 134, 634, 734 and/or 802 may alternatively be used. For example, the order of execution of the blocks may be changed, and/or some of the blocks described may be changed, eliminated, or combined.

As mentioned above, the example processes of FIGS. 9A, 9B and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 9A, 9B and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Referring to FIG. 9, the process 900 of FIGS. 9A and 9B monitors a loading dock 106, 606, 706. The program 900 begins at block 902 where a status of a door is determined (block 902). For example, the door status determiner 806 receives and/or analyzes a signal from the sensor 120. 601, 701, 820 to determine if a door 108, 608, 708 covering a doorway 104, 604, 704 is in an open position 110 or a closed position 206. If the door status determiner 806 determines if the door 108, 608, 708 is in the open position 110 (block 904), the process 900 returns to block 902.

If the door status determiner 806 determines that the door 108 is in the open position 110 at block 904, the deck position determiner 810 determines a position of the deck 114, 614, 714 (block 906). For example, the deck position determiner 810 receives and/or analyzes signals from the sensor 120, 601, 701, 822 to determine a position of the deck 114.

The deck position determiner 810 determines if the deck 114 is positioned within a threshold angle (block 908). For example, the deck position determiner 810 receives and/or analyzes a signal provided by the sensor 120, 601, 701, 822 to determine a position or an elevation of the deck 114, 614, 714 relative to normal (e.g., the floor 138). For example, the deck position determiner 810 determines that the deck 114 is within a threshold angle when the deck 114 is positioned at and/or between the lowered position 302 (e.g., a cross-traffic position) and the operative position 500. In some examples, the deck position determiner 810 determines that the deck 114 is at an elevation angle that is greater than the threshold when the deck 114 is positioned higher and/or at incline greater than an incline of the deck 114 at the operative position 500 and/or an angle that is too steep for a body or equipment to traverse (e.g., a slope too steep to walk between the rear edge 114a of the deck 114 and the front edge 114b). If the deck 114 is not within the threshold angle at block 908, the process 900 returns to block 902. In some such examples, the deck 114 may provide a barrier when the door is in the open position.

If the deck 114 is within the threshold angle at block 908, the loading dock condition analyzer 812 determines whether the presence of a vehicle at the loading dock should be detected using the sensor 120, 601, 701, 822 (block 910). If the sensor 120, 601, 701, 822 is used at block 910, the vehicle determiner 808 receives a first input or signal from the sensor 120, 601, 701, 822 (block 912). The vehicle determiner 808 determines whether the first input or signal is indicative of a vehicle being present (block 914). If the vehicle is not present at block 914, the vehicle determiner 808 communicates to the loading dock condition analyzer 812 that the vehicle is not present (block 926).

If a vehicle is present at the loading dock at block 914, the vehicle determiner 808 determines if a status of the vehicle restraint should be used to confirm the presence of the vehicle (block 916). If the sensor is not used at block 910 or the vehicle restraint is used at block 916, the vehicle determiner 808 determines the presence of the vehicle using information provided by the vehicle restraint 826 (block 918). The vehicle determiner 808 receives a second input or signal from the vehicle restraint 408, 826 (block 920). For example, the second input or signal may be provided by a switch sensor of the vehicle restraint that is indicative of the vehicle restraint 408 being engaged or captured with the vehicle 126. Based on the second input, the vehicle determiner 808 determines if the second input is indicative of the vehicle being present (block 922).

If the vehicle restraint is not used at block 916 or the second input is indicative of the vehicle being present at block 922, the vehicle determiner 808 determines that the vehicle is present at the loading dock (block 924). If the vehicle is present at block 924, the loading dock condition analyzer 812 commands or causes the output generator 814 to enable movement of the deck 114 (block 940).

If the first input is not indicative of the vehicle being present at block 914 or the second input is not indicative of the vehicle being present at block 922, the vehicle determiner 808 determines that a vehicle is not present (block 926).

The body presence determiner 804 then determines if a body is present in the second area 118, 618, 718 of the loading dock (block 928). For example, the body presence determiner 804 receives and/or analyzes a signal from the sensor 122, 601, 701, 822 to determine the presence of the body in the second area 118, 618, 718. If the body is present in the second area (block 930), the output generator 814 activates a warning (block 932).

If ta body is not present in the second area at block 930, the body presence determiner 804 determines if a body is present in the first area 116, 616, 716 (block 934). If a body is not present in the first area (block 936), the loading dock condition analyzer 812 instructs or commands the output generator 814 to enable movement of the deck 114 (block 940). If a body is present in the first area (block 936), the loading dock condition analyzer 812 instructs or commands the output generator 814 to restrict movement of the deck 114 (block 938).

If the process persists (block 942), the process 900 returns to block 902. For example, the process 900 persists until the door status determiner 806 determines that the door is in the closed position, the body is no longer present in the first area 116, 616, 716 and/or the body is no longer present in the second area 118, 618, 718. If the process does not persist (block 942), the process ends.

Referring to FIG. 10, the process 1000 begins with the body presence determiner 804 determining the presence of a body in the second area 118, 618, 718 (block 1002). For example, the body presence determiner 804 receives and/or analyzes a signal from the sensor 122, 601, 701, 822 to determine the presence of the body in the second area 118, 618, 718. If a body is not present (block 1004), the process 1000 returns to block 1002.

If a body is detected in the second area (block 1004), the vehicle determiner 808 determines the presence of the vehicle (block 1006). When the door is in the closed position, the door may obstruct the sensor 120, 601, 701 from detecting the presence of the vehicle. In some examples, the vehicle determiner 808 receives and/or analyzes a signal from the vehicle restraint 826 and/or the sensor 412 when the door is in a closed position and/or a signal from the sensor 120, 601, 701, the vehicle restraint 826 and/or the sensor 412 when the door is in the open position. If the vehicle determiner 808 determines the presence of the vehicle (block 1008), the process returns to block 1002.

If the vehicle determiner 808 determines that the vehicle is not present (block 1008), the door status determiner 806 determines the status of the door 108 (block 1010). If the door status determiner 806 determines that the door is open (block 1012), the loading dock condition analyzer 812 commands the output generator 814 to activate a warning (block 1014). If the door status determiner 806 determines that the door is not open (i.e., closed) at block 1012, the loading dock condition analyzer 812 commands the output generator 814 to prevent the door from opening (block 1016). For example, the output generator 814 may disable a motor of the door from operating.

Figure 11:
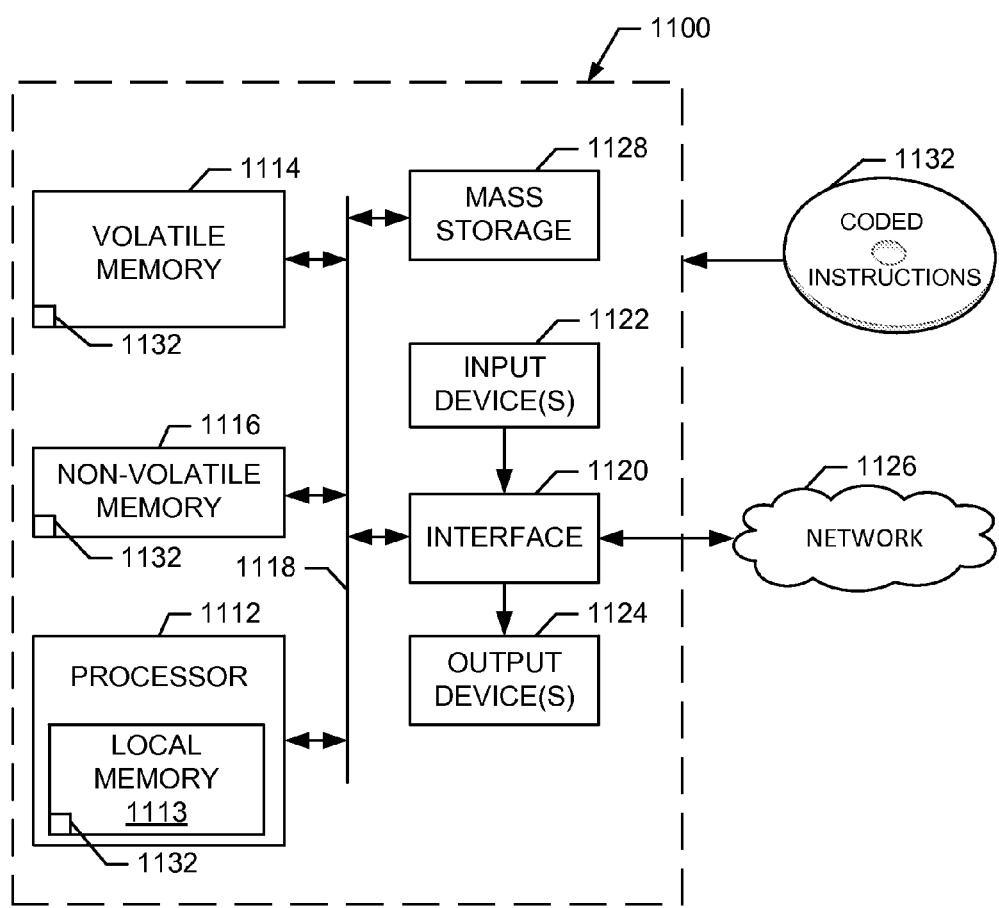
FIG. 11 is a schematic illustration of an example processor platform that may execute the instructions of FIGS. 9A, 9B and FIG. 10 to implement the example dock leveler controller of FIG. 8.

FIG. 11 is a block diagram of an example processor platform 1100 capable of executing the instructions of FIGS. 9A, 9B and 10 to implement the example controller 134, 634, 734 and/or 802. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1020 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 9A, 9B and 10 may be stored in the mass storage device 1128, in the volatile memory 1114, in the non-volatile memory 1116, and/or on a removable tangible computer readable storage medium such as a CD or DVD.

At least some of the aforementioned examples include one or more features and/or benefits including, but not limited to, the following:

In some examples, a method for monitoring a loading dock includes determining if a door at a doorway of a loading dock is in an open position; determining if a vehicle is present at the doorway; determining if a body is present in a first area of the loading dock, the first area including a deck positioned adjacent the doorway; and determining if a body is present in a second area of the loading dock, the second area adjacent the doorway and including only a portion of the deck adjacent the doorway.

In some examples, the method includes initiating a warning when the door is in the open position, the vehicle is not present at the doorway, and the body is in the second area.

In some examples, the method includes initiating the warning includes illuminating the second area of the deck.

In some examples, the method includes preventing operation of the deck when the door is in the open position, the vehicle is present at the doorway, and the body is in the first area.

In some examples, the method includes determining if an elevation of the deck is within a threshold angle when the door is in the open position, prior to determining if the body is present in the second area.

In some examples, the method includes preventing operation of the deck toward an operative position when the door is in the open position, an elevation of the deck is within the threshold angle, the body is not detected in the second area, and the body is detected in the first area.

In some examples, the method includes determining if the vehicle is present includes receiving at least one of a signal from a first sensor or a signal from a vehicle restraint sensor.

In some examples, the method includes determining if the door is in the open position includes receiving a signal from a first sensor and the determining if the body is present in the second area includes receiving a signal from a second sensor.

In some examples, the method includes determining if the body is present in the first area includes receiving a signal from a first sensor and the determining if the body is present in the second area includes receiving a signal from a second sensor.

In some examples, the method includes a method for monitoring a loading dock including monitoring a first area of the loading dock adjacent a doorway of a building, the first area includes a deck of the loading dock; monitoring a second area of the loading dock adjacent the doorway of the building, the second area including only a portion of the deck, the second area being less than the first area; determining if a body is present in the second area; determining if a vehicle is present at the doorway; and determining if a door at the doorway is in at least one of an open position or a closed position.

In some examples, the method includes preventing operation of the door from a closed position to an open position when: the door is in the closed position; the vehicle is not present at the doorway; and the body is determined to be in the second area.

In some examples, the method includes initiating a warning when: the door is in the open position; the vehicle is not present at the doorway; and the body is determined in the second area.

In some examples, the determining if the vehicle is present at the doorway includes a signal generated by a vehicle restraint at the loading dock when the vehicle restraint is activated to restrain the vehicle.

In some examples, the determining if the vehicle is present at the doorway includes a signal generated by a sensor located at an exterior of a building of the loading dock when the door is in the closed position.

In some examples, dock leveler system includes a deck positioned adjacent a doorway of a building to enable at least one of loading or unloading of cargo from a trailer of a vehicle, the deck being movable between a raised position and a lowered position; a first sensor to sense a first area adjacent the doorway of the building, the first sensor to sense at least one of a position of a door of the doorway, a presence of a vehicle at the doorway, or a presence of a first body in the first area; a second sensor to sense a second area extending over only a portion of the deck, the second area being smaller than the first area; and a processor to: detect, based on a signal received from the first sensor, the door being in at least one of an open position or a closed position, the presence of the first body on in the first area, or the presence of the vehicle at the loading; and detect, based on a signal received from the second sensor, a presence of a second body in the second area.

In some examples, the system includes a warning generator to activate a warning when the processor determines that the door is in the open position, the vehicle is not present at the doorway, and the second body is in the second area.

In some examples, the warning includes a light to illuminate the second area.

In some examples, the system includes a warning generator to activate a warning when the processor determines that the door is in the open position, the vehicle is present at the doorway, and the first body is in the first area.

In some examples, the system includes an output generator to prevent the door from moving from the closed position to the open position when the processor detects that the door is in the closed position, the vehicle is not present at the doorway, and the second body is detected in the second area.

In some examples, the system includes an output generator to prevent the deck from moving toward an operative position when the processor detects that the door is in the open position, the vehicle is present at the doorway, and the first body is detected in the first area.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for monitoring a loading dock, the method comprising:
    sensing, via a first sensor, a first area inside of a building of the loading dock, the first area including a first portion of a deck positioned adjacent a doorway; and
    sensing, via a second sensor, a second area inside of the building of the loading dock adjacent the doorway, the second area including a second portion of the deck adjacent the doorway;
    detecting, via a processor and a signal received from the first sensor, at least one of a door of the doorway being in at least one of an open position or a closed position, a presence of a body in the first area, or a presence of a vehicle at the loading dock; and
    determining, via a processor and a signal received from the second sensor, a presence of the body in the second area.

2. The method of claim 1, further comprising initiating a warning when the door is in the open position, the vehicle is not present at the doorway, and the body is in the second area.

3. The method of claim 2, wherein initiating the warning includes illuminating the second area of the deck.

4. The method of claim 1, further comprising preventing operation of the deck when the door is in the open position, the vehicle is present at the doorway, and the body is in the first area.

5. The method of claim 1, further comprising determining if an elevation of the deck is within a threshold angle when the door is in the open position, prior to determining if the body is present in the second area.

6. The method of claim 5, further comprising preventing operation of the deck toward an operative position when the door is in the open position, an elevation of the deck is within the threshold angle, the body is not detected in the second area, and the body is detected in the first area.

7. The method of claim 1, wherein determining the presence of the vehicle at the loading dock further includes receiving a signal from a vehicle restraint sensor.

8. A method for monitoring a loading dock, the method comprising:
    monitoring, via a first sensor, a first area of the loading dock adjacent a doorway and inside of a building, the first area includes a first portion of a deck of the loading dock;
    monitoring, via a second sensor, a second area of the loading dock adjacent the doorway and inside of the building, the second area positioned adjacent the first area and the second area including a second portion of the deck, the second area being less than the first area;
    determining if a first body is present in the first area based on a signal received from the first sensor; and
    determining if a second body is present in the second area based on a signal received from the second sensor.

9. The method of claim 8, further including:
    in response to a signal received from the first sensor:
        determining if a vehicle is present at the doorway; and
        determining if a door at the doorway is in at least one of an open position or a closed position.

10. The method of claim 9, further comprising preventing operation of the door from a closed position to an open position when:
    the door is in the closed position;
    the vehicle is not present at the doorway; and
    the second body is determined to be in the second area.

11. The method of claim 9, further comprising initiating a warning when:
    the door is in the open position;
    the vehicle is not present at the doorway; and
    the second body is determined in the second area.

12. The method of claim 8, further comprising determining if a vehicle is present at the doorway by receiving a signal generated by a vehicle restraint at the loading dock when the vehicle restraint is activated to restrain the vehicle.

13. The method of claim 8, further comprising determining if a vehicle is present at the doorway by receiving a signal generated by a sensor located at an exterior of a building of the loading dock when the door is in a closed position.

14. A dock leveler system comprising:
- a deck positioned adjacent a doorway of a building to enable at least one of loading or unloading of cargo from a trailer of a vehicle, the deck being movable between a raised position and a lowered position;
- a first sensor to sense a first area inside the building and adjacent the doorway, the first sensor to sense at least one of a position of a door of the doorway, a presence of a vehicle at the doorway, or a presence of a first body in the first area;
- a second sensor to sense a second area adjacent the first area inside the building adjacent the doorway, the second area being smaller than the first area; and
- a processor to:
  - detect, based on a signal received from the first sensor, the door being in at least one of an open position or a closed position, the presence of the first body on in the first area, or the presence of the vehicle at the loading; and
  - detect, based on a signal received from the second sensor, a presence of a second body in the second area.

15. The system of claim 14, further comprising a warning generator to activate a warning when the processor determines that the door is in the open position, the vehicle is not present at the doorway, and the second body is in the second area.

16. The system of claim 15, wherein the warning includes a light to illuminate the second area.

17. The system of claim 14, further comprising a warning generator to activate a warning when the processor determines that the door is in the open position, the vehicle is present at the doorway, and the first body is in the first area.

18. The system of claim 14, further comprising an output generator to prevent the door from moving from the closed position to the open position when the processor detects that the door is in the closed position, the vehicle is not present at the doorway, and the second body is detected in the second area.

19. The system of claim 14, further comprising an output generator to prevent the deck from moving toward an operative position when the processor detects that the door is in the open position, the vehicle is present at the doorway, and the first body is detected in the first area.

* * * * *

UNITED STATES PATENT AND TRADEMARK OFFICE
CERTIFICATE OF CORRECTION

PATENT NO. : 9,771,225 B2
APPLICATION NO. : 14/878204
DATED : September 26, 2017
INVENTOR(S) : Stone et al.

It is certified that error appears in the above-identified patent and that said Letters Patent is hereby corrected as shown below:

In the Claims

Column 21, Line 18, (Claim 14): Delete "on" between "the first body" and "in the first area".

Column 21, Line 20, (Claim 14): Replace "loading" with "doorway".

Signed and Sealed this
Thirteenth Day of November, 2018

Andrei Iancu
*Director of the United States Patent and Trademark Office*